I. ARNOLD.
FRUIT PICKER.
APPLICATION FILED JAN. 3, 1912.
1,034,333.
Patented July 30, 1912.
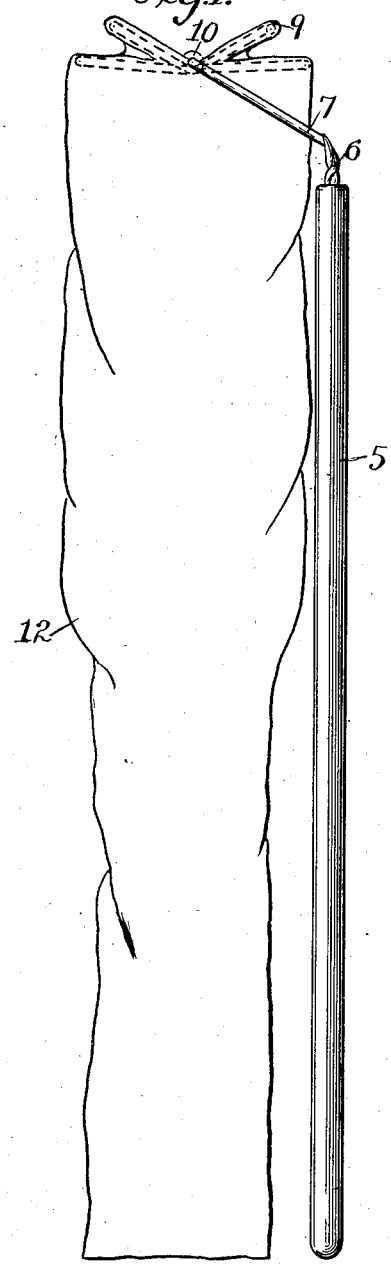
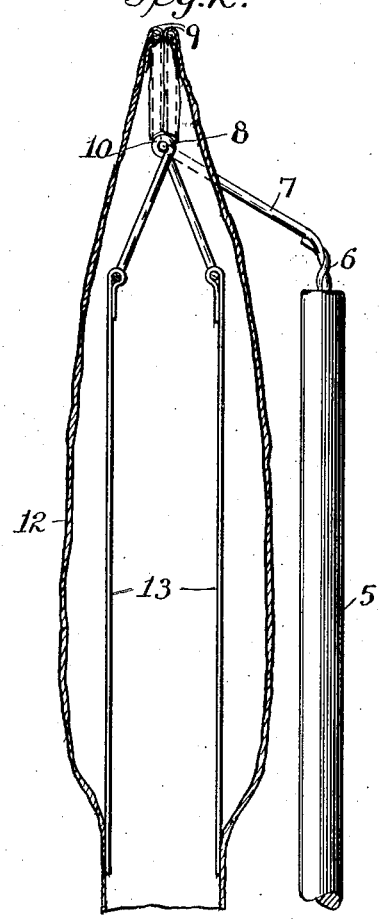
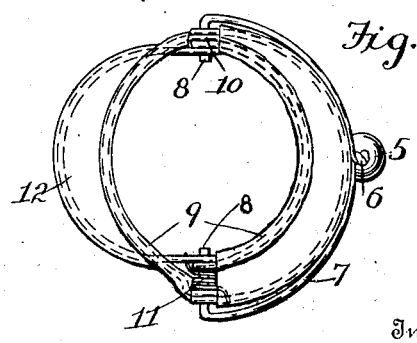
Witnesses
R. N. Jones.
H. O. Parker
Inventor
Isaac Arnold.
By Victor J. Evans
Attorney

UNITED STATES PATENT OFFICE.

ISAAC ARNOLD, OF OTTAWA, KANSAS.

FRUIT-PICKER.

1,034,333.　　　　Specification of Letters Patent.　　Patented July 30, 1912.

Application filed January 3, 1912. Serial No. 669,234.

*To all whom it may concern:*

Be it known that I, ISAAC ARNOLD, a citizen of the United States, residing at Ottawa, in the county of Franklin and State of Kansas, have invented new and useful Improvements in Fruit-Pickers, of which the following is a specification.

The invention relates to fruit pickers, and has for its primary object to provide a device of this character in which fruit of varying sizes may be removed from a tree and conveyed into the hand or into a receptacle near the operator, thus obviating the necessity of a person climbing a tree and plucking fruit, as is done in the ordinary manner.

Another object of the invention is the provision of a fruit picker in which fruit hanging upon a tree, irrespective of the height thereof, may be plucked, without causing the operator to reach for the fruit, and that will deliver the fruit to a convenient point, so that the same may be readily and quickly gathered and transported from one location to another.

A further object of the invention is the provision of a fruit picker of this character which is simple in construction, reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of the fruit picker constructed in accordance with the invention, the mouth thereof being shown opened. Fig. 2 is a vertical longitudinal sectional view through the catcher sleeve, showing the grab mouth thereof closed. Fig. 3 is a top plan view.

Similar reference characters indicate corresponding parts throughout the several views of the drawings.

Referring to the drawings by numerals, the fruit picker comprises a pole or handle 5 which is of any desirable length, so as to enable the fruit picker to be positioned for plucking the fruit hanging from a tree, irrespective of the height of the tree, and mounted in one end of the pole or handle is the twisted stem 6 of a fork 7, the ends of which are inturned to form pivots 8, on which are journaled crossed circular-shaped opening and closing jaws 9, each being formed at diametric points thereof with eyes 10 loosely engaging the pivots 8 of the fork or yoke 7, and coiled about one of said pivots 8 is a compression spring 11, the ends of which are suitably engaged with the said jaws 9, so as to normally hold the same in position for opening the mouth end of a receiver, presently described.

The receiver comprises a flexible sleeve 12, preferably constructed from fabric, such as cheese-cloth, one end thereof being fastened, for instance, by stitches, to the jaws 9 on substantially one-half of their circumference, so that the remaining circumference of the jaws will lie interiorly of the sleeve 12 and have connected thereto pull tapes 13, the same being connected to the sleeve 12, interiorly thereof, at opposite points of the same, the tapes being so connected that the sleeve, between the points of connection of the tapes therewith and the open mouth thereof, is normally slack, so that on an initial pull upon the sleeve, the tapes will be drawn upon for causing the closing of the jaws 9 to grab and pluck fruit hanging from a tree. After the fruit has been plucked, the same will travel downwardly in the sleeve and be discharged through the opposite open end thereof into the hand of the operator of the fruit picker or into a sack or other depository. Thus, in this manner the fruit can be readily gathered, without possibility of bruising the same, and also that will avoid the necessity of a person climbing the tree for picking the fruit therefrom.

What is claimed is:

A fruit picker comprising a standard, a yoke fixed in one end of the standard and having its fork limbs bent at an angle thereto, inturned ends on the said limbs to form pivots, substantially circular-shaped members having eyes formed at diametrically opposite points thereof for receiving the inturned pivot ends of the yoke, a tubiform flexible body having one end connected with the jaws about substantially one-half of the circumference of each so that the remaining portion of the members will lie interiorly of the body, means acting upon the members to
5 normally sustain the end of the body connected thereto in open position, and tapes connected with the free portions of the members and with the body interiorly thereof to hold the same at all times slack between the points of connection of the tape.

In testimony whereof I affix my signature in presence of two witnesses.

ISAAC ARNOLD.

Witnesses:
W. J. R. MENDARIS,
EDWIN C. DAVIS.

Copies of this patent may be obtained for five cents each, by addressing the "Commissioner of Patents, Washington, D. C."